(12) United States Patent
Furniss

(10) Patent No.: US 10,668,870 B2
(45) Date of Patent: Jun. 2, 2020

(54) STORAGE DRAWER ASSEMBLY FOR VEHICLE TRAY

(71) Applicant: Paul Furniss, Singleton (AU)

(72) Inventor: Paul Furniss, Singleton (AU)

( * ) Notice: Subject to any disclaimer, the term of this patent is extended or adjusted under 35 U.S.C. 154(b) by 0 days.

(21) Appl. No.: 15/756,350

(22) PCT Filed: Aug. 31, 2016

(86) PCT No.: PCT/AU2016/000301
§ 371 (c)(1),
(2) Date: Feb. 28, 2018

(87) PCT Pub. No.: WO2017/035560
PCT Pub. Date: Mar. 9, 2017

(65) Prior Publication Data
US 2018/0281699 A1    Oct. 4, 2018

(30) Foreign Application Priority Data

Aug. 31, 2015    (AU) ................................ 2015903547

(51) Int. Cl.
*B60R 11/06*    (2006.01)
*B62D 29/00*    (2006.01)
*B62D 33/02*    (2006.01)

(52) U.S. Cl.
CPC ............ *B60R 11/06* (2013.01); *B62D 29/008* (2013.01); *B62D 33/02* (2013.01)

(58) Field of Classification Search
CPC ............... B60R 9/06; B60R 11/06; B60P 3/14
USPC ............................................. 296/37.6, 26.13
See application file for complete search history.

(56) References Cited

U.S. PATENT DOCUMENTS

| | | | |
|---|---|---|---|
| 4,573,731 A | 3/1986 | Knaack | |
| 4,830,242 A * | 5/1989 | Painter | B60P 3/32 224/404 |
| 5,743,584 A | 4/1998 | Lance et al. | |
| 6,199,894 B1 | 3/2001 | Anderson | |
| 6,328,364 B1 | 12/2001 | Darbishire | |

(Continued)

FOREIGN PATENT DOCUMENTS

EP        1531086        5/2005

OTHER PUBLICATIONS

International Search Report for PCT/AU2016/000301, dated Nov. 7, 2016.

(Continued)

*Primary Examiner* — Dennis H Pedder
(74) *Attorney, Agent, or Firm* — Stephen J. Weyer; Stites & Harbison PLLC

(57) ABSTRACT

A storage drawer assembly capable of fitting to a vehicle. The drawer assembly comprises a primary space frame having at least a front wall, side walls and at least one intermediate wall between the sidewalls together defining compartments therein. The compartments are each capable of receiving and retaining there within a drawer mounted on a runner to enable the drawer to slide in and out of one said compartments. The frame is arranged to enable the drawers when open to extend beyond the periphery of the vehicle. The primary space frame receives and retains cladding forming a rear, top and bottom walls; wherein the bottom wall includes fixation apertures which receive fasteners which secure the drawer assembly to a vehicle tray.

14 Claims, 10 Drawing Sheets

(56) References Cited

U.S. PATENT DOCUMENTS

| | | |
|---|---|---|
| 6,550,837 B1 | 4/2003 | Preiss |
| 6,648,391 B1 | 11/2003 | Whiteford et al. |
| 6,695,375 B1 | 2/2004 | May |
| 6,712,415 B1 | 3/2004 | Darbishire et al. |
| 7,025,398 B1 | 4/2006 | Montagna et al. |
| 2007/0158968 A1* | 7/2007 | Chandler .................. B60P 3/14 296/37.6 |
| 2008/0231066 A1* | 9/2008 | Harrell ...................... B60R 9/00 296/37.6 |
| 2014/0305977 A1 | 10/2014 | Sparks |

OTHER PUBLICATIONS

Written Opinion of the International Searching Authority for PCT/AU2016/000301, completed Nov. 7, 2016.

\* cited by examiner

STORAGE DRAWER ASSEMBLY FOR VEHICLE TRAY

BACKGROUND

The present invention relates generally to storage apparatus and equipment for work vehicles and in particular to a drawer assembly adapted for use with a vehicle having a tray for supporting moveable loads such as goods, equipment and products. More particularly the invention provides a storage drawer assembly which is incorporated with a vehicle trays and which is accessible from an external location. The invention further provides a drawer assembly for incorporation with the tray of a vehicle and which is arranged to be detachably fitted to a vehicle tray body. The invention is primarily applicable to lightweight utility vehicles having a rear tray mounted on a chassis and it will be convenient to hereinafter describe the invention in relation to that exemplary application. However, it is to be appreciated that the invention is not to be construed as limited to that application.

PRIOR ART

There are in existence a large variety of assemblies for use in storage of goods on vehicles. These generally comprise compartments which are either retrofitted to a vehicle tray or located as free standing compartments. There are also in the prior art various tray modifications including tray extension devices which are used for loading and unloading of goods carried by the vehicle. An example of the known art is disclosed in U.S. Pat. No. 6,648,391 which teaches a truck bed extension device for use with a truck having a cargo bed structure, wherein the device allows for carrying items which extend beyond or overhang the bed structure. The device comprises a deck; a support structure; and a signalling system. The deck is horizontally adjustable relative to the bed structure so as to allow for achieving a desired spacing therebetween. U.S. Pat. No. 6,199,894 discloses another apparatus and method for modification to a truck frame, the apparatus including extended frame rails and interconnecting members.

In a further example of tray modification, U.S. Pat. No. 7,025,398 discloses a pull out system, or a pull out drawer system for vehicles and trailers using an inverted French F-channel as a stationary rail; an inverted U-channel as a movable rail; and/or a cam-follower bearing being present among rollers on the rails.

U.S. Pat. No. 6,328,364 discloses a pull out drawer system for vehicles and trailers includes a stationary mounting frame having a set of rails parallel with one another, which has a first set of rollers mounted thereon. The rails are adapted for receiving a second set of rollers. A movable frame has the second set of rollers mounted thereon; and a load-bearing surface is mounted to the movable frame. The movable frame and load-bearing surface subcombination mounted to the stationary mounting frame with rolling contact both between the first set of rollers and the movable frame and load-bearing surface subcombination and between the set of rails and the second set of rollers.

In a further example of a prior art assembly, U.S. Pat. No. 6,712,415 discloses an easy to install pull out cargo-carrying tray frame for pickup trucks including a stationary frame to which is attached a wedgeable attachment member that can be employed to secure the stationary frame to a cargo area of a vehicle or trailer. The device can be part of an extendible drawer or tray device.

Storage compartments have been provided in the past on vehicles having a load tray, rear storage compartment or the like. These usually comprise boxes having an access lid which allows top or side access. Typically such compartments are configured for access via the top usually from outside or inside the vehicle foot print. The boxes are either free standing or fixed to a part of the vehicle such as to the vehicle tray. With only top access, these boxes become internally cluttered and equipment can be buried by other equipment and in effect lost from view which is inefficient and inconvenient for a user. In this case tools have to be removed to gain access to other tools.

As can be seen from the aforesaid prior art, there have been numerous solutions provided for storage on and for loading and unloading of vehicle trays and storage cabins with each essentially purpose built.

There is a long felt want in the industry to provide a more convenient storage assembly for vehicles and particularly light weight vehicles. There is also a need to provide a storage assembly which satisfies the dual objective of convenient stowage without taking up available storage space and which is quick and easy to assemble and which provides ease of access to vehicle storage. There is also a need to provide an improved drawer assembly which allows a user to conveniently access equipment stored in the drawers without the inconvenience manifest in tray mounted deep storage bins.

INVENTION

The present invention provides storage apparatus and equipment for work vehicles and in particular to a drawer assembly adapted for use with a vehicle having a tray for supporting moveable loads such as goods, equipment and products. More particularly the invention provides a storage drawer assembly which is incorporated with and retrofittable to a vehicle tray and which is side accessible from an external location. The invention further provides a drawer assembly for incorporation with the tray of a vehicle and which is arranged to be detachably fitted to a vehicle tray body. The invention is primarily applicable to lightweight utility vehicles having a rear tray mounted on a chassis and it will be convenient to hereinafter describe the invention in relation to that exemplary application. However, it is to be appreciated that the invention is not to be construed as limited to that application.

The invention provides a drawer assembly which is conveniently stowable as a permanent or temporary fitting to a vehicle tray and which provides increased and more efficient storage for the same footprint taken by conventional storage assemblies. The invention further provides an assembly which is quick and easy to assemble and which provides ease of access to stored goods. More particularly, the invention provides a drawer assembly which locates in a prefabricated space frame.

In its broadest form the present invention comprises:
a storage drawer assembly capable of fitting to a vehicle, the drawer assembly comprising;
a primary space frame having at least a front wall, side walls and at least one intermediate wall between the sidewalls together defining compartments therein;
the compartments each capable of receiving and retaining therewithin a drawer mounted on a runner to enable the drawer to slide in and out of one said compartments;
wherein the frame is arranged to enable the drawers when open to extend beyond the periphery of the vehicle.

According to a preferred embodiment the according to claim 1 wherein the primary space frame of the storage drawer assembly receives and retains cladding forming a rear, top, side and bottom walls; wherein the bottom wall includes fixation apertures which receive fasteners which secure the drawer assembly to a vehicle tray. The drawers slide in and out of the front wall of said primary frame. According to one embodiment the storage drawer assembly further comprises a gate cover which moves between a first state in which the cover conceals each drawer and a second state in which the drawers are accessible for use. Preferably the storage drawer assembly is arranged to accommodate 2, 3, 4 or 6 drawers.

In another broad form the present invention comprises: a storage drawer assembly capable of fitting to a tray of a vehicle, the drawer assembly comprising;
a primary space frame mountable on the tray and having at least a front, sides and a back end defining an internal space divided into at least one compartment;
cladding on the space frame forming a roof over the internal space;
an opening along one said sides of said frame which receive a plurality of drawers for retention in the internal space; and retain the compartments each capable of receiving and retaining therewithin one of the drawers mounted on a runners to enable the at least one drawer to slide in and out of one said compartments;
wherein the frame is arranged to enable the drawers when open to extend beyond a side periphery of the vehicle.

According to one embodiment the drawer assembly further comprises at least one intermediate wall between the sidewalls of the frame and which extends longitudinally along the frame from front to rear. The intermediate wall defines on one side a rear of said drawer compartments and on an opposite side an auxiliary storage compartment. According to a preferred embodiment, the auxiliary storage compartment includes a rear door panel and a side panel thereby allowing access to the auxiliary compartment from at least two sides.

The storage drawer assembly further comprises for each draw a pair of extendible runners retained by the frame. The drawers when closed, are hidden from view via a detachable door which is mounted via a door latch against the side of the drawer assembly. The roof of the space frame includes lifting lugs which allow removal of the drawer assembly from the tray of the vehicle. A variety of materials may be selected for construction of the drawer assembly or for individual parts of the assembly. The frame, roof and doors are manufactured from lightweight aluminium and the drawers may bee manufactured from aluminium or plastics.

The storage draw assembly is preferably detachably fitted to the tray via bolts or screws or both as required. A maximum footprint of the area of the drawer assembly is the same as a maximum foot print of the vehicle tray. Alternatively a maximum footprint of the drawer assembly may be less than a maximum footprint of the vehicle tray. The drawer assembly further comprises side and rear doors, where at least one of said side doors covers front faces of the drawers. In one embodiment, there are three drawers and in an alternative embodiment there are four drawers. It will be appreciated that drawer numbers are flexible and me be less than or more than an optimal four drawers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

The present invention provides an alternative to the known prior art and the shortcomings identified. The foregoing and other objects and advantages will appear from the description to follow. In the description reference is made to the accompanying representations, which forms a part hereof, and in which is shown by way of illustration specific embodiments in which the invention may be practiced.

These embodiments will be described in sufficient detail to enable those skilled in the art to practice the invention, and it is to be understood that other embodiments may be utilized and that structural changes may be made without departing from the scope of the invention. In the accompanying illustrations, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

The invention will be better understood and objects other than those set forth above will become apparent when consideration is given to the following detailed description thereof. Such description will now be described in more detail according to a preferred but non limiting embodiment and with reference to the accompanying illustrations wherein.

DETAILED DESCRIPTION

The present invention will now be described in more detail according to a preferred embodiment but non limiting embodiment and with reference to the accompanying illustrations. The examples referred to herein are illustrative and are not to be regarded as limiting the scope of the invention. While various embodiments of the invention have been described herein, it will be appreciated that these are capable of modification, and therefore the disclosures herein are not to be construed as limiting of the precise details set forth, but to avail such changes and alterations as fall within the purview of the description.

Figure 1:
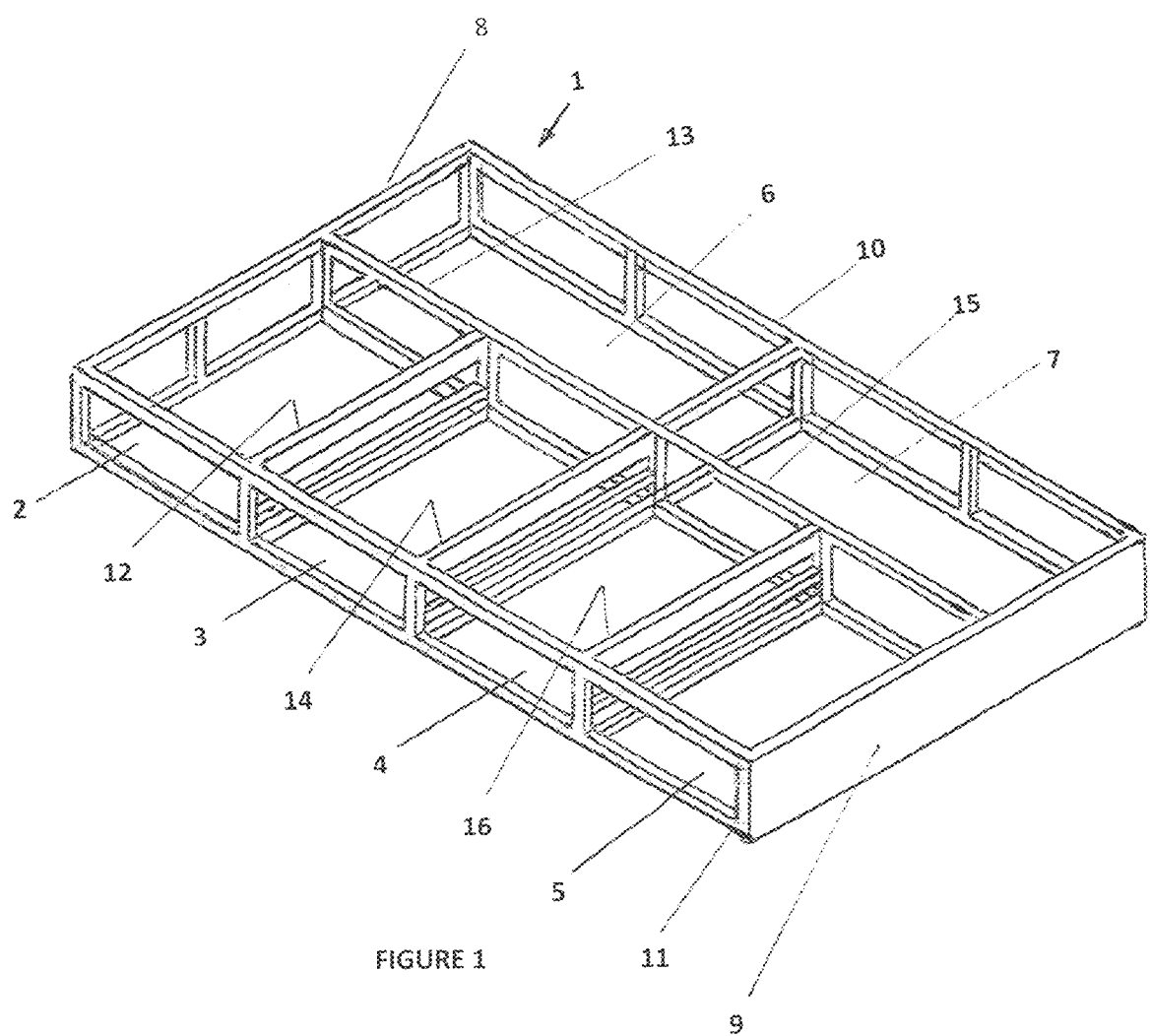
FIG. 1 shows a perspective view of a skeletal space frame which provides a superstructure of a drawer assembly according to one embodiment.

Referring to FIG. 1 there is shown according to one embodiment a perspective view of a skeletal space frame 1 which provides a superstructure for a drawer assembly according to one embodiment. Frame 1 comprises a series of compartments 2, 3, 4, 5, 6 and 7 defining a space in which drawers can be accommodated. Frame 1 includes side walls 8 and 9, a back wall 10 and front wall 11. In the non limiting embodiment shown, compartment 1 is defined by side wall 8 and intermediate walls 12 and 13. Compartment 2 is defined by partition walls 12, 13 and 14. Compartment 3 is defined by walls 14, 15 and 16. Compartment 4 is defined by intermediate walls 15 and 16 and side wall 9.

Frame assembly 1 can be proportioned to accommodate various vehicles tray models and it can also be proportioned to take up the full tray area or part thereof. The configuration and arrangement of frame 1 is one embodiment but with will be appreciated that other configurations are contemplated. For example there may be multiple drawers per compartment and tiered draws and drawers can be located in compartments 6 and 7.

Figure 2:
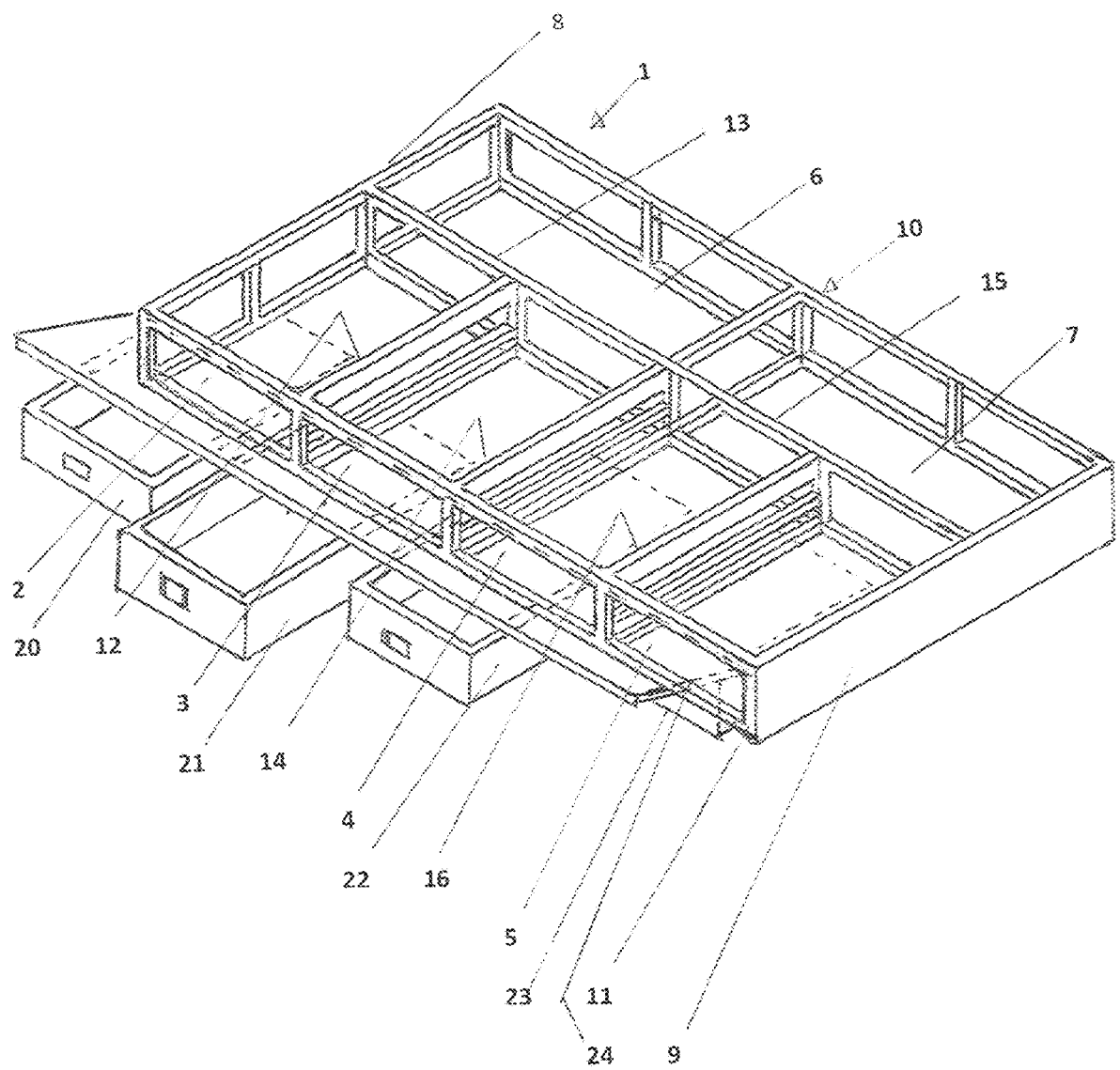
FIG. 2 shows the perspective view of a skeletal space frame of FIG. 1 this time with drawers shown extending in a open position.

FIG. 2 shows with corresponding numbering, the perspective view of the skeletal space frame 1 of FIG. 1 this time with drawers 20, 21, 22 and 23 respectively located in an open configuration in compartments 2, 3, 4 and 5. shown extending in a open position. Connected to frame 1 is a cover 24 which is preferably pivotally connected to frame 1. Once drawers 20, 21, 22 and 23 are closed, cover is rotated down to conceal and secure the drawers in their retracted position.

Figure 3:
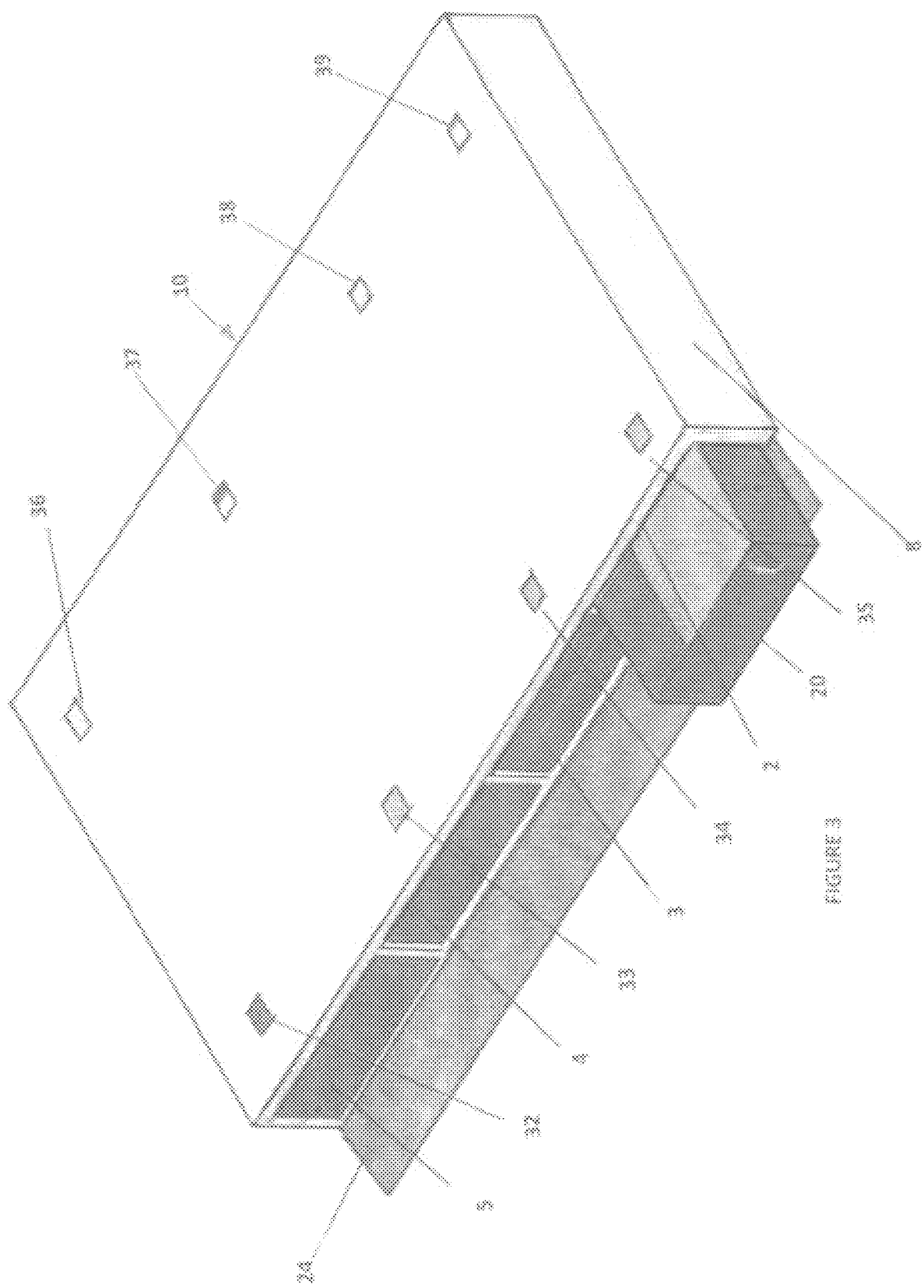
FIG. 3 shows the assembly from a perspective fully assembled including the space frame of FIG. 1 showing the cladding and gate extended according to one embodiment.

FIG. 3 shows a drawer assembly 30 from a perspective view fully assembled including the space frame 1 of FIG. 1 (concealed). Assembly 30 includes base 31 showing an array of fixation openings 32, 33, 34, 35, 36, 37, 38 and 39. These may also be tie down points using eyelets. In this embodiment drawer 20 is shows partially extended from compartment 2 with gate cover 24 rotated to its open position.

Figure 4:
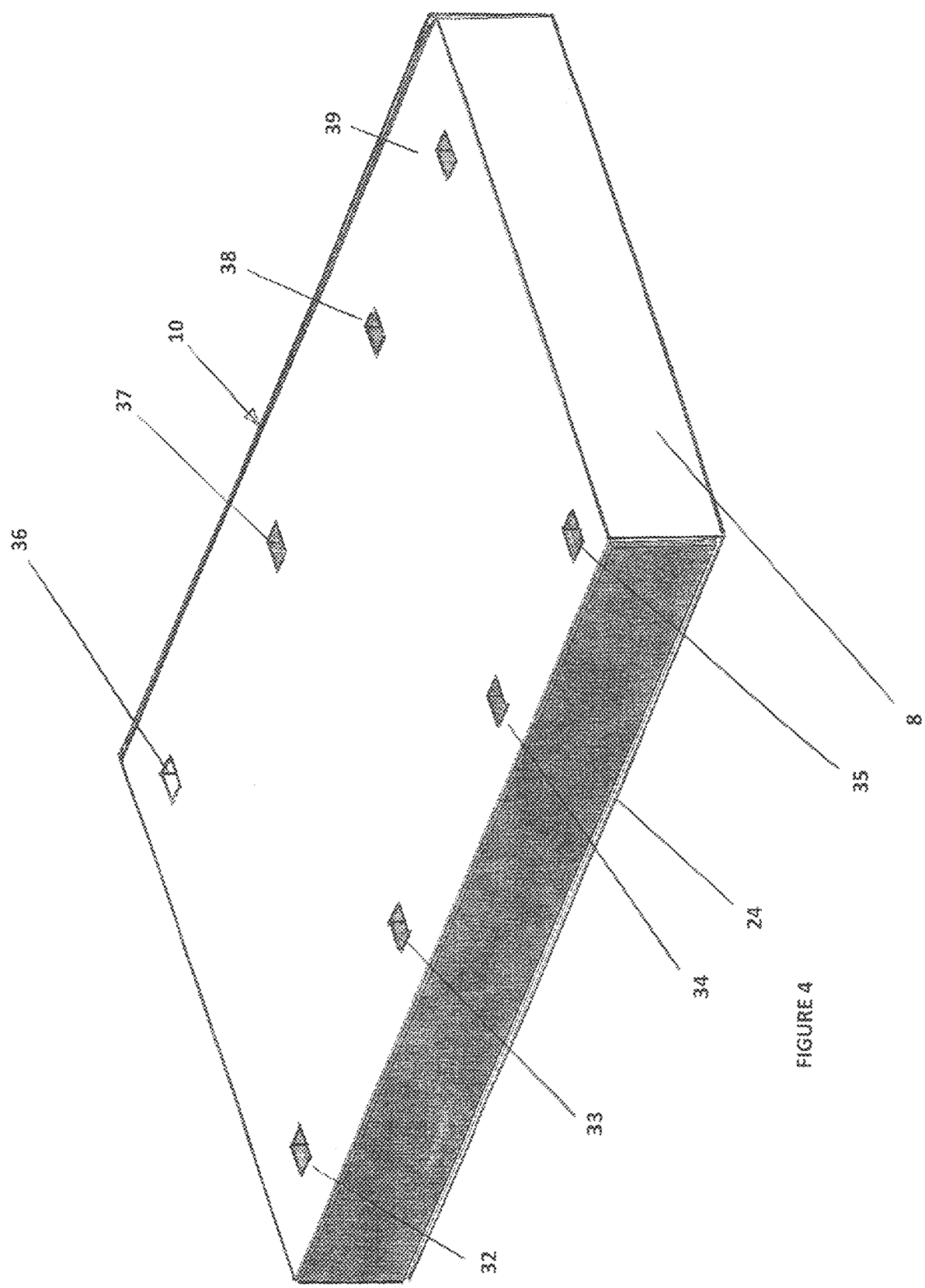
FIG. 4 shows the perspective view of FIG. 3 with gate closed.

FIG. 4 shows with corresponding numbering, the perspective view of the assembly 30 of FIG. 3 with gate cover 24 closed concealing drawers.

Figure 5:
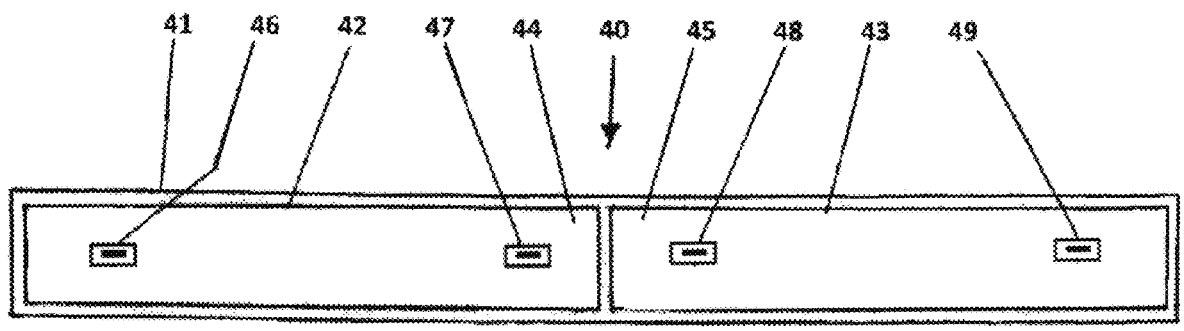
FIG. 5 shows an elevation view of a two drawer assembly according to one embodiment.

FIG. 5 shows an elevation view of a two drawer assembly 40 according to one embodiment. Assembly 40 includes a skeletal frame 41 which defines two compartments 42 and 43 which respectively receive and retain drawers 44 and 45. Typically draw 44 being relatively large in width includes two handles 46 and 47. Likewise draw 45 includes handles 48 and 49.

Figure 6:
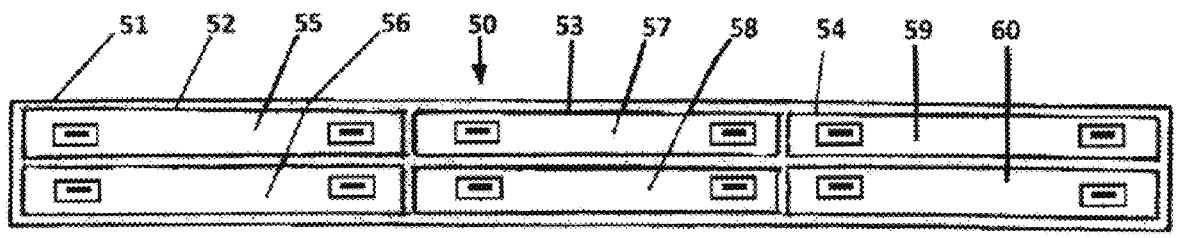
FIG. 6 shows an elevation view of a six drawer assembly according to another embodiment.

FIG. 6 shows an elevation view of a six drawer assembly 50 according to an alternative embodiment. Assembly 50 includes a skeletal frame 51 which defines three compartments 52, 53 and 54. Compartment 52 receives tiered drawers 55 and 56. Compartment 53 receives and retains drawers 57 and 58. Likewise compartment 54 receives and retains tiered drawers 59 and 60. Each drawer is equipped with two hands as previously described for drawers 44 and 45.

Figure 7:
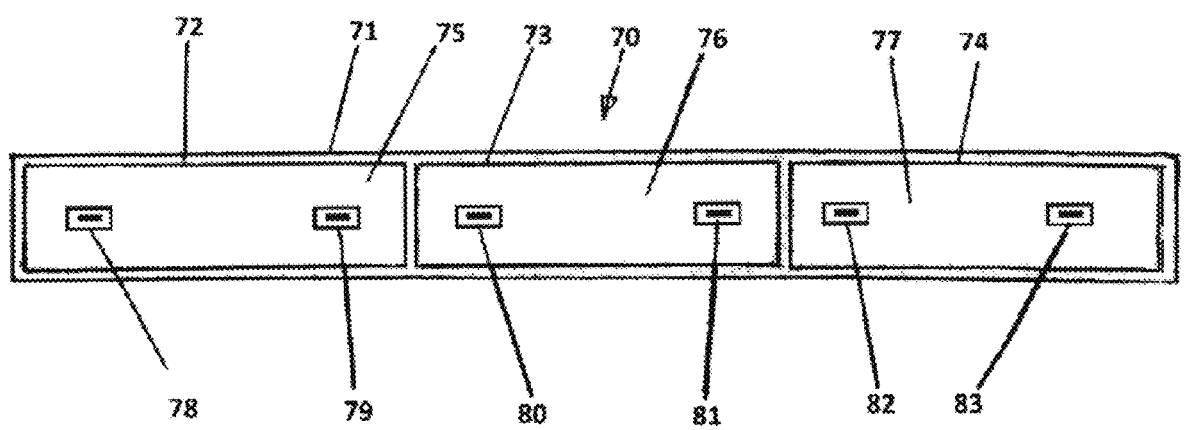
FIG. 7 shows an elevation view of a three drawer assembly according to another embodiment.

FIG. 7 shows an elevation view of a three drawer assembly 70 according to another embodiment. Assembly 70 includes a skeletal frame 71 which defines three compartments 72, 73 and 74 which respectively receive and retain drawers 75, 76 and 77. Drawer 75 includes two handles 78 and 79. Likewise draw 76 includes handles 80 and 81 and drawer 77 includes handles 82 and 83.

Figure 8:
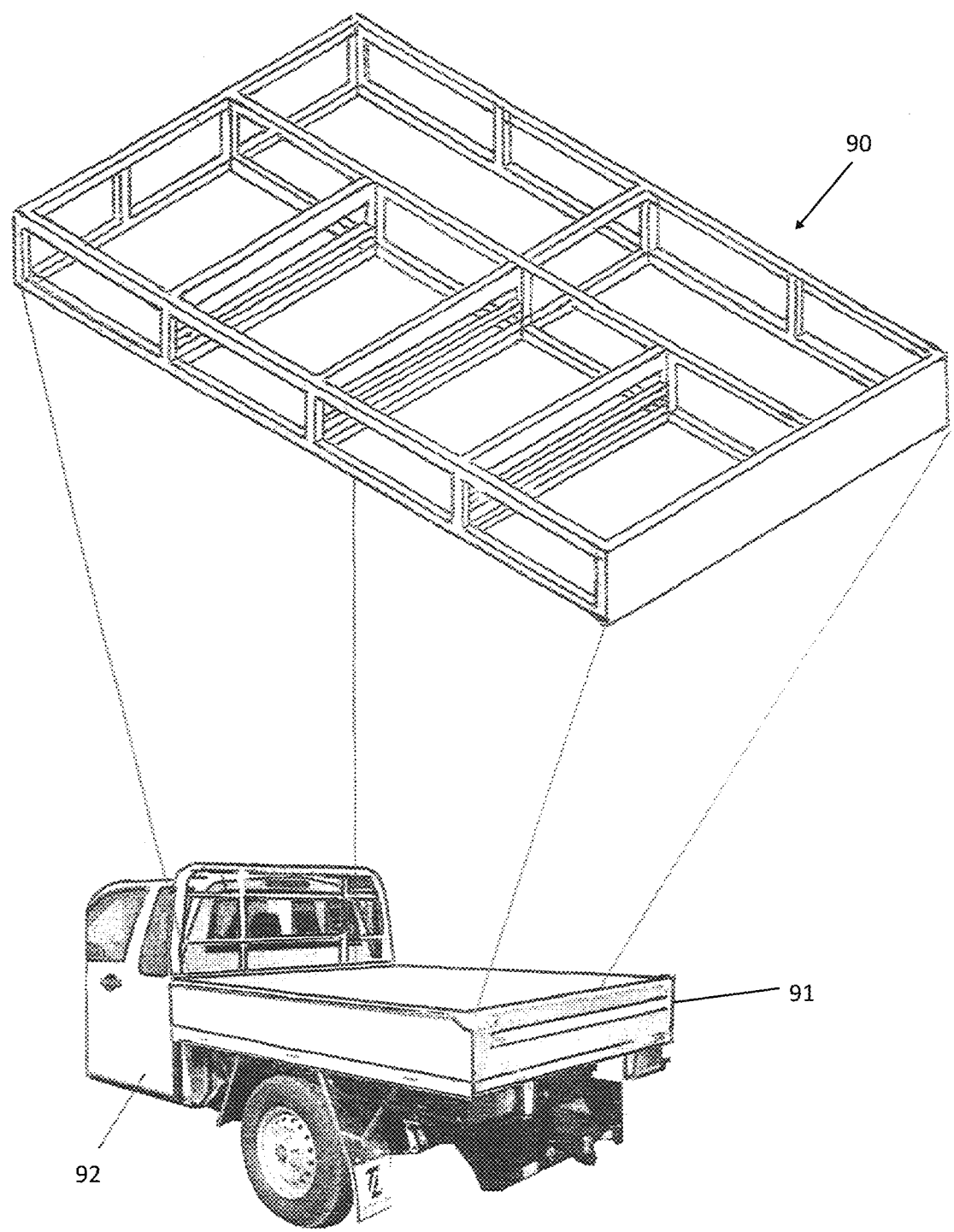
FIG. 8 shows an exploded view of a frame assembly indicating its location on a typical vehicle tray.

FIG. 8 shows an exploded view of a frame assembly 90 similar to the frame assembly 1 of FIG. 1 indicating its location on a tray 91 of a vehicle 92. Frame 90 may be oriented such that the drawers extend from either side but for safety reasons it is preferable that the drawers are fitted to extend from a curb side of a vehicle when parked. Typically that will be the left side of the vehicle. Surrounding each drawer is a waterproofing seal which prevents water ingress into the drawers when not in use. The drawers are mounted on roller bearings or other suitable carriage and can be locked when not in use.

Figure 9:
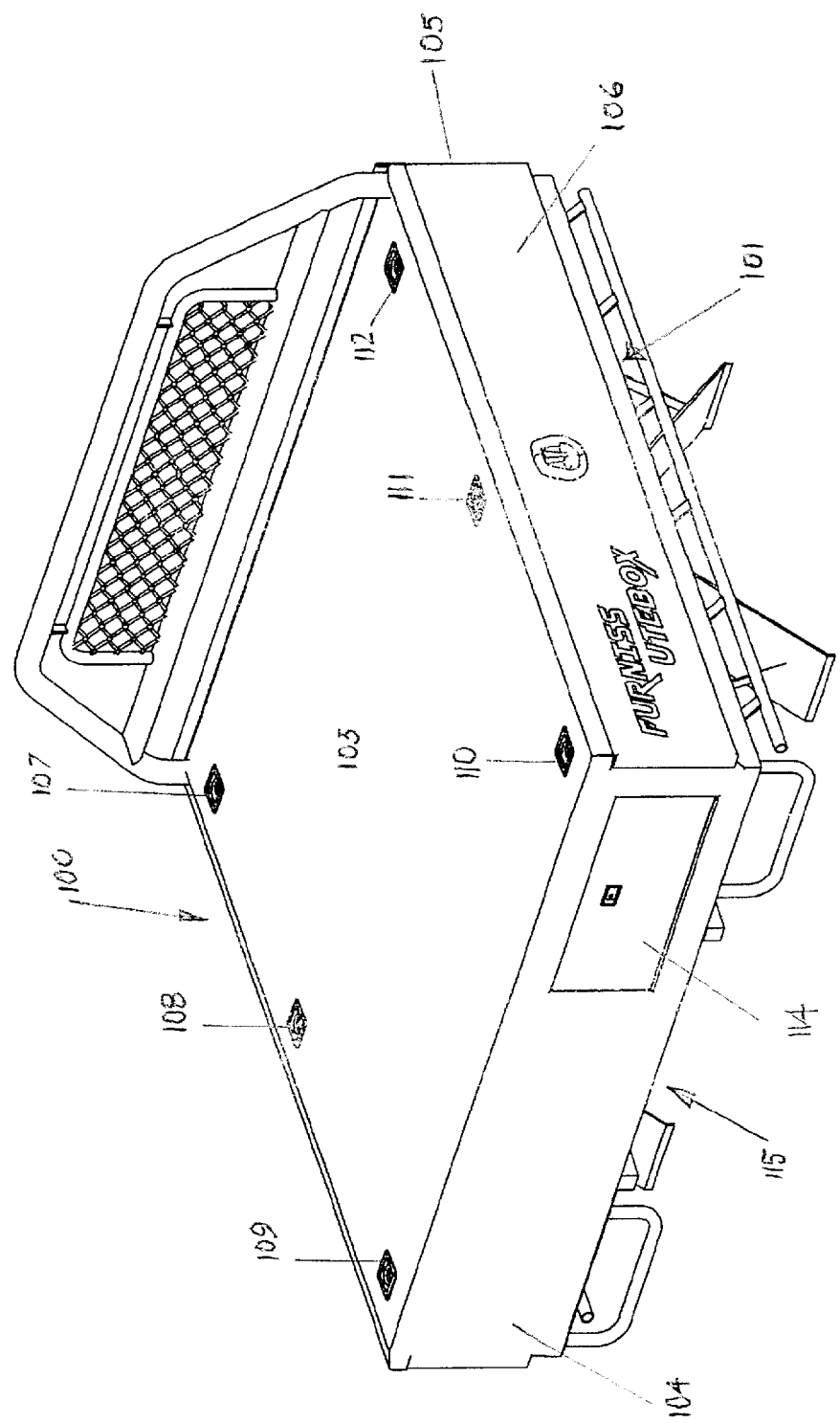
FIG. 9 shows a perspective view of a drawer assembly mounted on a vehicle tray according to an alternative embodiment.

FIG. 9 shows a perspective view of a drawer assembly 100 mounted on a vehicle tray 101 according to an alternative embodiment. Assembly 100 comprises a space frame 102 (see FIG. 10) which provides a superstructure for a plurality of drawers contained therein. Space frame 102 according to the embodiment shown, is incorporated into a housing 115 comprising a planar roof 103, rear wall 104, front wall 105 and door 106. Roof includes a series of lifting lugs 107, 108, 109, 110, 111 and 112. Each of the lifting lugs are covered via seals 131 (see FIG. 10). Rear wall 104 incorporates an access door 114. Housing 115 is adapted dimensionally to accommodate the shape of the vehicle tray on which it is mounted.

Figure 10:
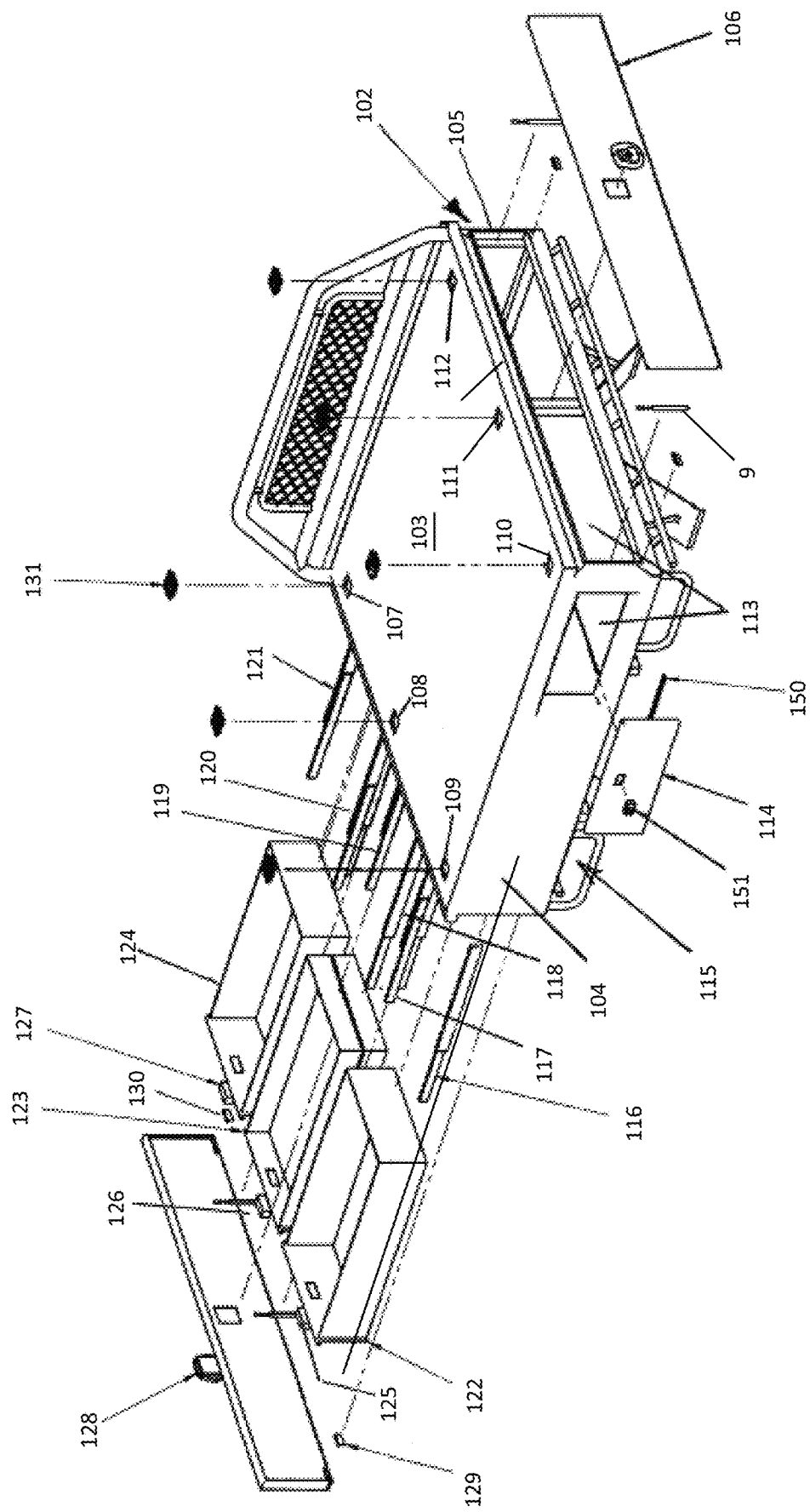
FIG. 10 shows an exploded view of the drawer assembly of FIG. 9.

FIG. 10 shows with corresponding numbering, an exploded view of the drawer assembly 100 of FIG. 9. Roof 103, rear wall 104, front wall 105 and door 106 together define internal space 113 which will accommodate drawers to be described below. Internal space 113 receives and retains therein a plurality of runners 116, 117, 118, 119, 120 and 121. Runners 116, 117 receive and control drawer 122. Runners 118, 119, receive and control drawer 123. Runners 120 and 121 receive and control drawer 124. Each of drawers 122, 123 and 124 are equipped with respective drawer latches 125, 126 and 127, which each engages space frame 102 to lock the drawers in position for transit. When drawers 122, 123 and 124 are closed, door 128 covers internal space 113 and is mounted via hinges 129 and 130.

Assembly 100 is a three drawer assembly but it will be appreciated by persons skilled in the art that alternative drawer configurations are contemplated. For example, the drawers can be re orientated to be operable from the opposite side or via presently described rear wall 104. For right hand drive vehicles, drawer operation is preferred for safety reasons. For left hand drive vehicles, right hand side drawer operation is safest. Drawers 122, 123 and 124 are shown taking up part only of internal space 113. According to an alternative embodiment, the drawers can be extended to full vehicle with if required. In the embodiment shown drawer 122 is larger than drawer 123. Door 114 includes an electric latch 151 which facilitates opening and closing supported on hinge 150.

Figure 11:
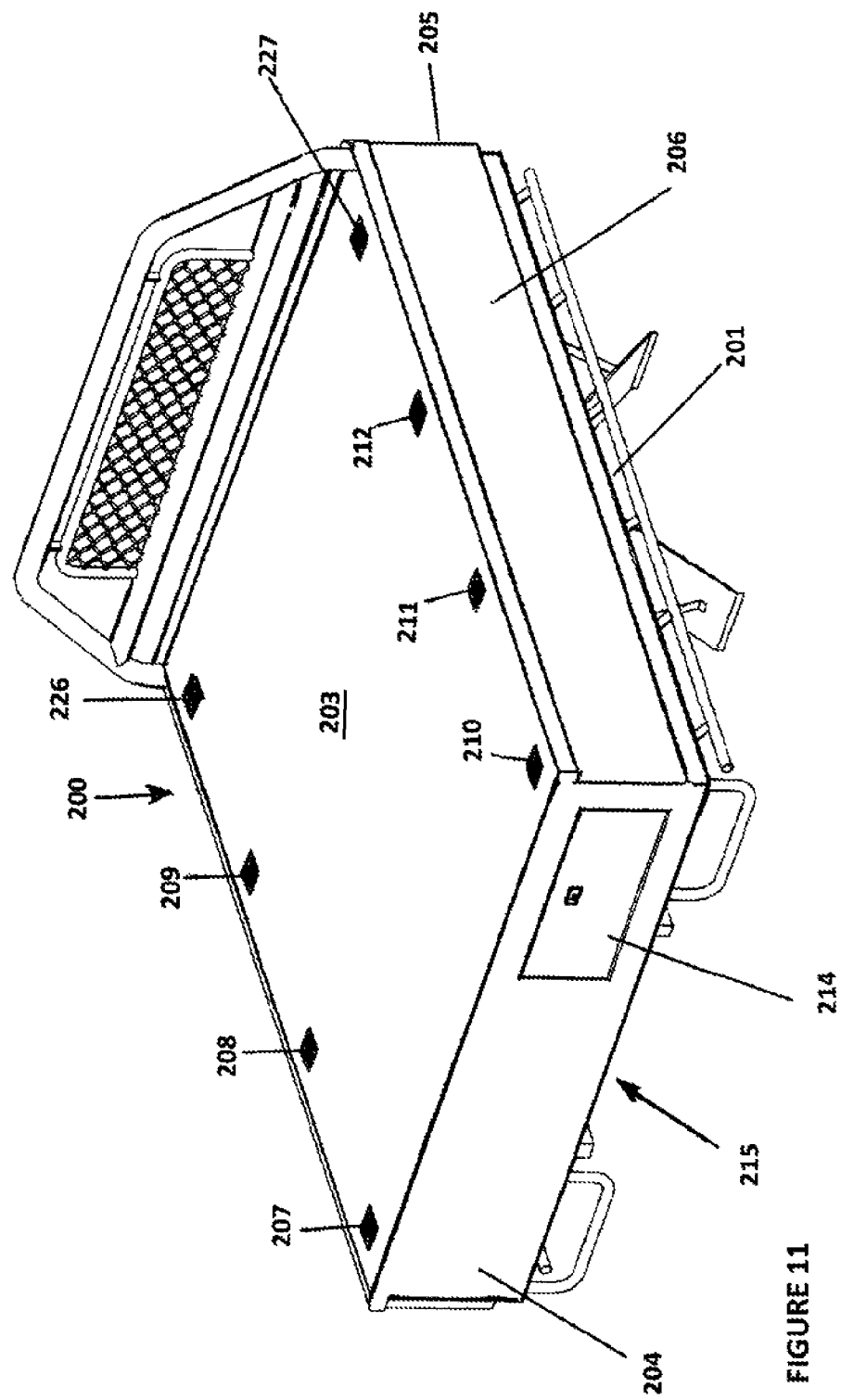
FIG. 11 shows a perspective view of a drawer assembly mounted on a vehicle tray according to a further alternative embodiment.

FIG. 11 shows a perspective view of a drawer assembly 200 mounted on a vehicle tray 201 according to an alternative embodiment. Assembly 200 comprises a space frame 202 (see FIG. 12) which provides a superstructure for a plurality of drawers contained therein. Space frame 202 according to the embodiment shown, is incorporated into a housing 215 comprising a planar roof 203, rear wall 204, front wall 205 and door 206. Roof includes a series of lifting lugs 207, 208, 209, 210, 211, 212, 226 and 227. Each of the lifting lugs are covered via seals 231 (see FIG. 12). Wall 204 incorporates an access door 214. Housing 215 is adapted dimensionally to accommodate the shape of the vehicle tray on which it is mounted.

Figure 12:
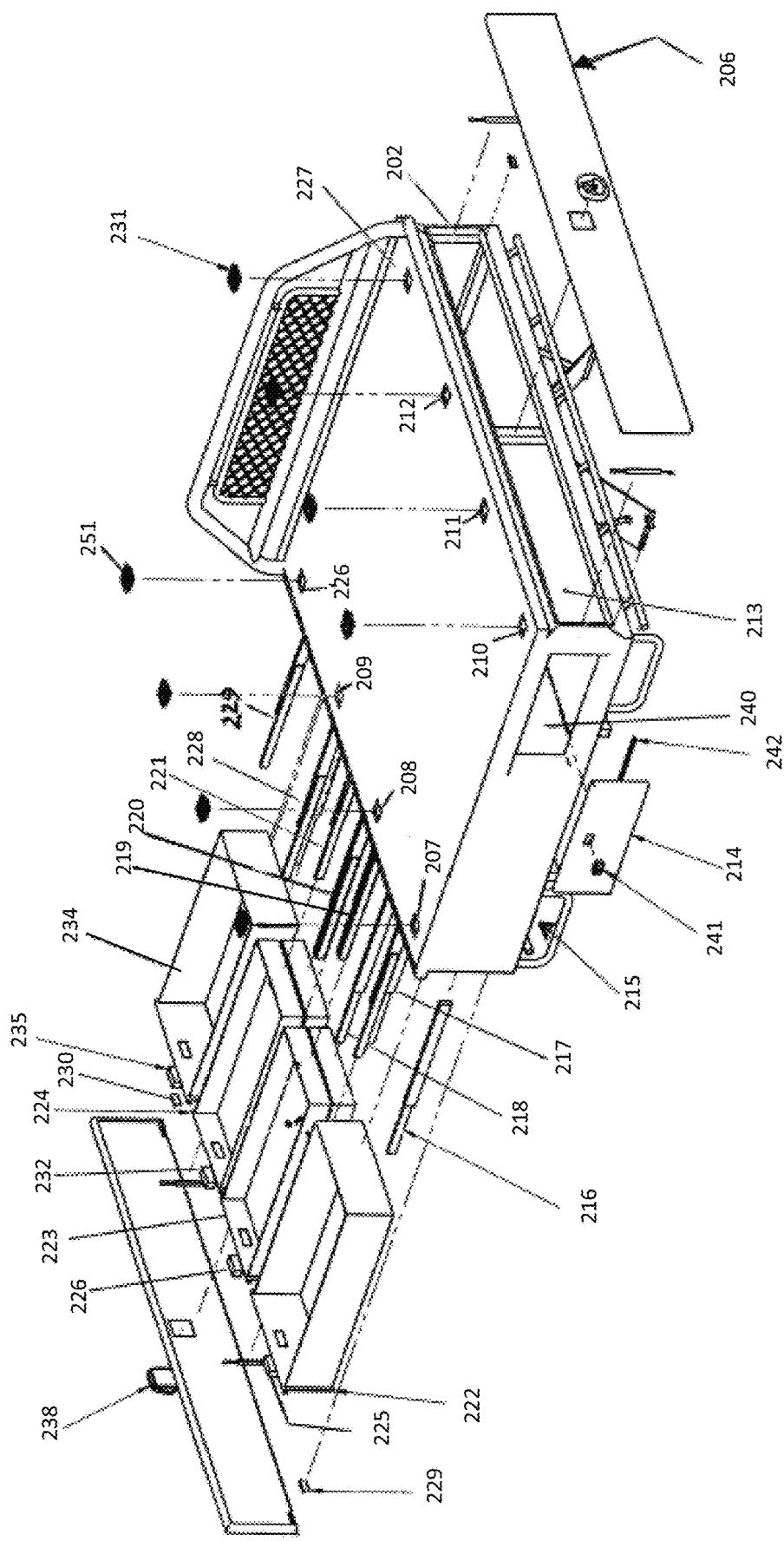
FIG. 12 shows an exploded view of the drawer assembly of FIG. 11

FIG. 12 shows an exploded view of the drawer assembly of FIG. 11. Roof 203, rear wall 204, front wall 205 and door 206 together define internal space 213 which will accommodate drawers to be described below. Internal space 213 receives and retains therein a plurality of runners 216, 217, 218, 219, 220, 221, 228 and 229. Runners 216, 217 receive and control drawer 222. Runners 218, 219, receive and control drawer 223. Runners 220 and 221 receive and control drawer 224. Runners 228 and 229 receive and control drawer 234. It will be appreciated that the runners can be arranged as required depending upon the nature of the drawer and whether it will be supported laterally or centrally along its centreline. Each of drawers 222, 223, 224 and 234 are equipped with respective drawer latches 225, 226, 232 and 235, which each engages space frame 202 to lock the drawers in position for transit. When drawers 222, 223, 224 and 234 are closed, door 238 covers internal space 213 and is mounted via hinges 229 and 230.

Assembly 200 is a four drawer assembly but it will be appreciated by persons skilled in the art that alternative drawer configurations in this embodiment are contemplated. For example, the drawers can be re orientated to be operable from the opposite side or via presently described rear wall 204. Drawers 222, 223, 224 and 234 are shown taking up part only of internal space 213 and terminating at internal wall 240. According to an alternative embodiment, the drawers can be extended to full vehicle with if required. Door 214 includes an electric latch 241 which facilitates opening and closing supported on hinge 242.

The assembly described above has a number of advantages over the prior art arrangements which include the following. Firstly, the storage assembly is easily retrofitted to a tray of a vehicle and secondly the assembly may therefore be detachably fitted to an existing vehicle tray.

It will be recognised by persons skilled in the art that numerous variations and modification may be made to the invention broadly described herein with out departing from the overall spirit and scope of the invention.

The invention claimed is:

1. A storage drawer assembly capable of fitting to a tray of a vehicle, the drawer assembly comprising:
   a primary space frame mountable on the tray and having at least a front, sides and a back end defining an internal space divided into at least one compartment;
   cladding on the space frame forming a roof over the internal space;
   an opening along one said sides of said frame which receive a plurality of drawers for retention in the internal space;
   the compartments each capable of receiving and retaining therewithin one of the drawers mounted on runners to enable the at least one drawer to slide in and out of one said compartments;
   at least one intermediate wall between the sidewalls of the frame and which extends longitudinally along the frame from front to rear; the intermediate wall defining on one side a rear of said drawer compartments and on an opposite side, an auxiliary storage compartment; the auxiliary storage compartment including a rear door panel and a side panel thereby allowing access to the auxiliary compartment from at least two sides; and
   wherein, the frame is arranged to enable the drawers when open to extend beyond a side periphery of the vehicle.

2. The storage drawer assembly according to claim 1 wherein the drawers each operate along a pair of extendible runners retained by the frame.

3. The storage drawer assembly according to claim 2 wherein the drawers when closed are hidden from view via a detachable door, which is mounted via a door latch against a side of the drawer assembly.

4. The storage drawer assembly according to claim 3 wherein the roof of the space frame includes lifting lugs, allowing removal of the drawer assembly from the tray of the vehicle.

5. The storage drawer assembly according to claim 4 wherein the frame, roof and doors are manufactured from aluminium.

6. The storage drawer assembly according to claim 5 wherein the drawers are manufactured from aluminium or plastics.

7. The storage drawer assembly according to claim 6 wherein the storage drawer assembly is detachably fitted to the tray.

8. The storage drawer assembly according to claim 7 where a maximum footprint of the area of the drawer assembly is the same as a maximum foot print of the vehicle tray.

9. The storage drawer assembly according to claim 8 further comprising side and rear doors, where at least one of said side doors covers front faces of the drawers.

10. The storage drawer assembly according to claim 9 wherein there are three drawers.

11. The storage drawer assembly according to claim 10 wherein there are four drawers.

12. The storage drawer assembly according to claim 11 wherein the space frame receives and retains the cladding forming a rear, top, side and bottom walls; wherein the bottom wall includes fixation apertures which receive fasteners which secure the drawer assembly to a vehicle tray.

13. The storage drawer assembly according to claim 12 wherein the drawers slide in and out of an opening in an outer wall of said frame.

14. The storage drawer assembly according to claim 13 wherein the frame is arranged to accommodate 2, 3, 4 or 6 drawers.

* * * * *